T. J. SLOAN.
Grinding Mill.
No. 54,261.
Patented April 24, 1866.
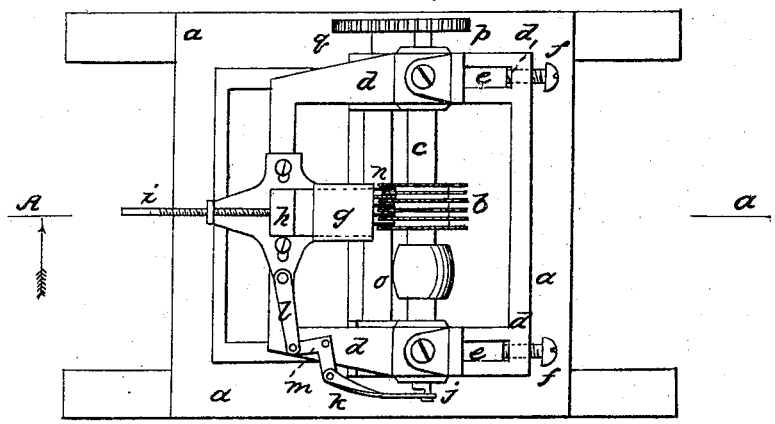
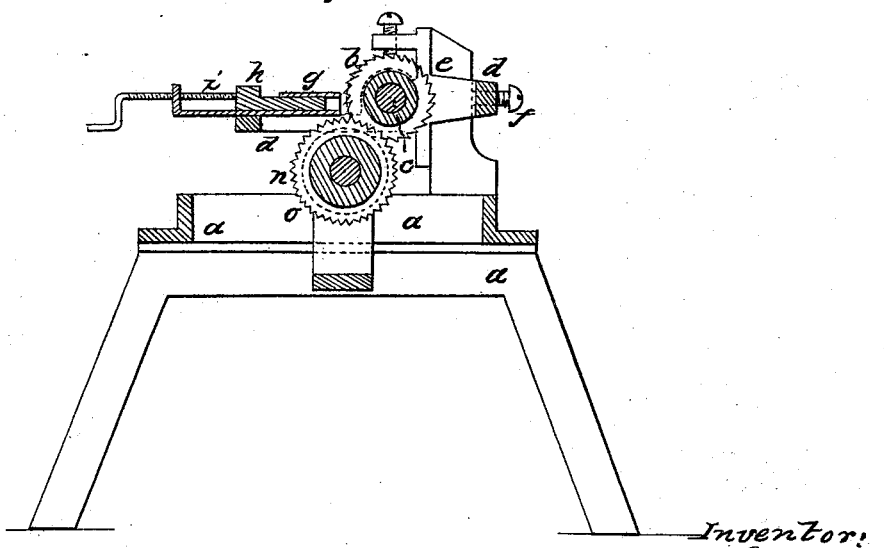

UNITED STATES PATENT OFFICE.

THOMAS J. SLOAN, OF NEW YORK, N. Y., ASSIGNOR TO JOHN G. SLOAN, OF PARIS, FRANCE.

IMPROVEMENT IN GRINDING-MILLS.

Specification forming part of Letters Patent No. 54,261, dated April 24, 1866.

*To all whom it may concern:*

Be it known that I, THOMAS J. SLOAN, of the city, county, and State of New York, have invented certain new and useful Improvements in Machinery for Grinding and Reducing Vegetable Substances; and I do hereby declare that the following is a full, clear, and exact description thereof, reference being had to the accompanying drawings, making part of this specification, in which—

Figure 1 is a plan, and Fig. 2 a vertical section taken in the plane of the line A *a* of Fig. 1.

The same letters indicate like parts in both figures.

In my said machine the vegetable substances to be ground or reduced are placed in a feeding-box and pushed forward by a follower toward the grinding-surface, which grinding-surface consists of a series of circular saws mounted on a shaft, with interposed washers, and to cause the said saws to act upon every part of the vegetable substances a vibratory or lateral reciprocating motion is given to the feeding-box; and as the teeth and the spaces between the saws would soon become filled and clogged by the vegetable substance reduced, I have combined with the series of grinding or reducing saws a series of serrated or pointed disks, mounted on another and parallel shaft, with washers interposed, and so relatively arranged as to work between the saws, and traveling at a higher velocity than the saws, to take hold of and clear the clogging matter from the teeth and the spaces between the saws.

In the accompanying drawings, *a* represents a suitable frame, and *b* a series of parallel circular saws, with interposed washers, and mounted on a shaft, *c*. This shaft runs in boxes on a frame, *d*, which is fitted by mortises to slide on standards *e e* of the main frame *a*, so that it can be fastened at any desired elevation by temper-screws *f f*. This is for the purpose of adjusting the saws relatively to the clearing-disks, and any other equivalent mode of adjustment may be substituted. In front of this series of saws there is a feed-box, *g*, in which the substances to be ground and reduced are to be placed and pushed forward toward the saws by a follower, *h*, which may be operated by a hand-screw, *i*, or any of the well-known automatic feed-motions. This feeder-box is mounted on the frame *d*, so that it can slide on ways parallel with the axis of the shaft *c*, and it receives a reciprocating motion from a crank, *j*, on the end of the shaft *c* by two connecting-rods, *k* and *l*, and an intermediate bell-crank lever, *m*.

By reason of reciprocating the feeder-box every part of the substances to be ground receives the action of the saws, notwithstanding the open spaces between them.

Below the series of saws there is a series of parallel circular disks, *n*, with serrated or pointed peripheries. These disks are put on a shaft, *o*, with interposed washers, and the shaft is mounted in the main frame and parallel with the shaft *c*. These disks should be at the same distance apart as the saws, and their serrated peripheries extend into the spaces between the saws.

The two shafts *c* and *o* are geared together to rotate in opposite directions by means of two cog-wheels, *p q*, and either the said cog-wheels are to be made of equal diameter and the disks *n* of greater diameter than the saws *b*, or, what is equivalent, the disks *n* and saws *b* may be of equal diameter and the cog-wheel *p* on the shaft of the saws made of larger diameter than the cog-wheel *q* on the shaft of the disks, the object being to have the periphery of the disks to travel faster than the periphery of the saws, to act upon and clear out the vegetable matter which tends to accumulate in the teeth of and in the spaces between the saws.

What I claim as my invention, and desire to secure by Letters Patent, is—

1. The combination of the series of clearing-disks with the series of grinding or reducing saws, when the periphery of the disks is made to travel faster than the periphery of the saws, substantially as and for the purpose described.

2. Giving to the feeder-box a reciprocating motion, substantially as described, in combination with the series of circular saws set with their planes at right angles with their axis of rotation, and having spaces between them, substantially as and for the purpose specified.

THOS. J. SLOAN.

Witnesses:
 WM. H. BISHOP,
 ANDREW DE LACY.